United States Patent [19]

Morishima

[11] 4,128,799

[45] Dec. 5, 1978

[54] SEMI-CONDUCTOR VOLTAGE REGULATOR, PARTICULARLY FOR AUTOMOTIVE USE

[75] Inventor: Toshio Morishima, Kariya, Japan

[73] Assignee: Robert Bosch GmbH, Stuttgart, Germany

[21] Appl. No.: 824,818

[22] Filed: Aug. 15, 1977

[51] Int. Cl.² .......................... H02J 7/14; H02P 9/30
[52] U.S. Cl. ...................................... 322/28; 320/64; 322/73
[58] Field of Search ............... 320/39, 64, 68; 322/28, 322/59, 73, 32

[56] References Cited

U.S. PATENT DOCUMENTS

| | | | |
|---|---|---|---|
| 3,491,285 | 1/1970 | Nowakowski | 322/73 X |
| 3,544,881 | 12/1970 | Raver et al. | 322/73 X |
| 3,868,558 | 2/1975 | Winkley et al. | 322/28 X |

Primary Examiner—Robert J. Hickey
Attorney, Agent, or Firm—Flynn & Frishauf

[57] ABSTRACT

To compensate for voltage drop upon high loading of an automotive type alternator, the output of which is rectified, a main semi-conductor control switch is connected to control the output voltage of the alternator by selectively connecting, and disconnecting current flow through the field winding of the alternator. A voltage divider is used to obtain a control voltage for the main semi-conductor switch. An auxiliary sensing circuit is connected to sense waviness, or ripple content of the output voltage and, if it exceeds a pre-determined limit, controls an auxiliary semi-conductor switch which is connected to the voltage divider to modify the voltage division ratio thereof and thereby change the regulating effect of the main semi-conductor switch.

7 Claims, 3 Drawing Figures

SEMI-CONDUCTOR VOLTAGE REGULATOR, PARTICULARLY FOR AUTOMOTIVE USE

The present invention relates to a voltage regulator circuit, and more particularly to a voltage regulator circuit to control the output of the dynamo electric generator, especially a three phase alternator for automotive use.

It has previously been proposed to increase the output of an alternator by connecting a diode to the center or star point so that the output power delivered by the alternator also affects the control voltage. The output voltage derived from the alternator itself is rectified to supply d-c power charged battery or supply other loads. Output wave shape is not a pure d-c voltage, however, but has a substantial ripple superimposed thereover. Ripple voltages may be quite substantial. As the speed of the alternator increases, and the load increases, the affect of the waviness, that is, the proportion of ripple, of the output voltage increases.

Ordinary voltage regulators which are connected to such systems do not function efficiently under such conditions.

SUBJECT MATTER OF THE PRESENT INVENTION

It is an object to provide a voltage regulator in which the voltage is maintained steady or level, regardless of loading on the alternator or change in speed thereof, particularly to higher speed operation.

Briefly, a main semi-conductor controlled switch is connected to control current flow through the field winding of the dynamo electric machine, typically a three phase automotive alternator; a voltage sensing means is connected to sense the average output voltage of the machine and to control the main semi-conductor switch to, in turn, control current flow through field winding. An auxiliary voltage sensing means is additionally connected to the output voltage of the dynamo electric generator to sense minimum instantaneous voltage levels thereof, that is, to sense the minimum of the d-c output of the superimposed ripple. The auxiliary semi-conductor controlled switch has its output connected to modify the main voltage sensing means, by modifying the voltage division ratio of a voltage divider. The auxiliary semi-conductor controlled switch is controlled for core induction, or cutoff in accordance with the minimum sensed instantaneous voltage.

Drawings, illustrating an example:

Figure 3:
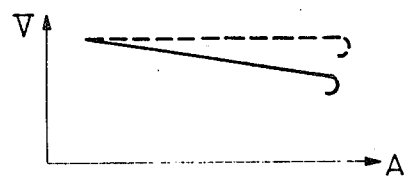

And FIG. 3 is a current (abscissa) versus voltage (ordinate) diagram illustrating output voltage with respect to current supplied with a voltage regulator in accordance with the prior art (solid line curve) and in accordance with the present invention (broken line curve).

Figure 2:
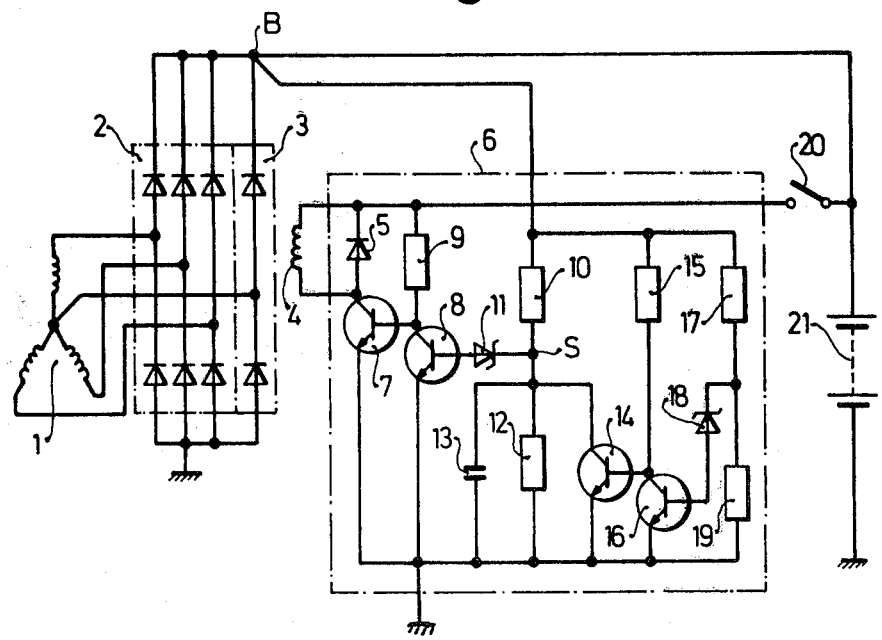
FIG. 2 is a schematic circuit diagram illustrating a practical embodiment of voltage regulator in accordance with the present invention.

The armature winding 1 (FIG. 2) of an a-c generator for automotive use is excited by a field shown schematically only by the field winding 4. The armature is star connected and the output terminals are connected to a full wave three phase rectifier 2. The star point is connected to two diodes 3 to add the output of the armature winding 1 as a generator power-responsive parameter. The field winding 4 has a free wheeling or anti-inductive kick diode 5 connected in parallel thereto. The current through the field winding is controlled by a voltage regulator 6 which includes npn transistor 7, having its main current path connected in series with the field 4. The base current of transistor 7 is controlled by a resistor 9 connected between base and collector and by a further transistor 8. The base of transistor 8 is connected through a Zener diode 11 to a junction S which is the midpoint of a voltage divider formed by resistors 10, 12. Resistor 12 is bridged by capacitor 13 which is a smoothing capacitor. The transistor 14 is connected across the parallel circuit of resistor 12 and capacitor 13. When transistor 14 is conductive, it short circuits resistor 12. Transistor 14 has its base connected through a resistor 15 to the other terminal of resistor 10 and then to the main output terminal B of the rectifier 2. Two resistors 17, 19 form a voltage divider, the tap or junction point of which is connected through a Zener diode 18 to the base of transistor 16, the collector of which is connected to the base of transistor 14. The rectifier 2 supplies current to a battery 21. A main power switch, which, in the vehicle is the ignition switch 20 is connected from the positive terminal of battery 21 to the field 4 and the resistor 9.

Figure 1:
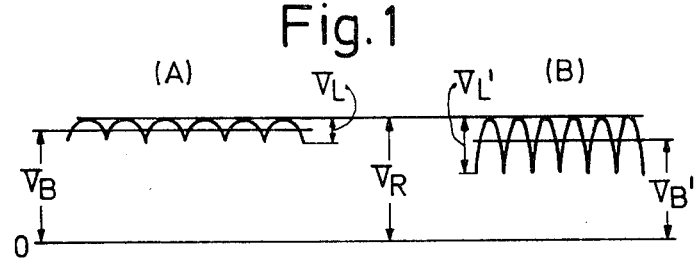
FIG. 1 is a representation of the output wave shape derived from the rectifier of an automotive current supply system.

Operation, with further reference to FIGS. 1 and 3:

At comparatively low speed of the alternator and medium, or light loading, the regulator operates as seen in section A of FIG. 1. The maximum voltage VR is limited to a value which has a pre-determined level below the maximum $V_R$. The ripple voltage is shown as VL, and the average output voltage indicated as $V_B$.

As the speed and loading increases, the output voltage will appear as shown in section B of FIG. 1. The maximum output voltage VR will remain; the ripple will increase, however, resulting in the ripple voltage as shown VL', and resulting in an average output voltage VB'. As can readily be seen, the ripple has increased with respect to the ripple of the portion A of FIG. 1 and the average value VB' of the controlled voltage has decreased, without, however, modifying the maximum control voltage VR. Thus, at high speeds and high loading, the apparent controlled voltage drops, which may result in discharge from the battery and insufficient charging and supply of power from the alternator. The voltage-current characteristics are shown in FIG. 3, solid line.

Upon closing of iginition switch 20 (FIG. 2), current is supplied from battery 21 through resistor 9 to transistor 7. Supply of base current to transistor 7 causes transistor 7 to become conductive and current is supplied to the field winding 4. Let it be assumed that the engine is started at the same time, and the voltage at the output terminal B of the alternator rises. As soon as the voltage B has reached a pre-determined value, the auxiliary Zener diode 18 will become conductive. Transistor 16 will thus be controlled to become conductive causing transistor 14 to be blocked. When the voltage at terminal B still increases further, the voltage at the tap or division point S of the voltage divider 10, 12 will increase. This will cause the main Zener diode 11 to become conductive, causing transistor 8 to become conductive which drops voltage at the base of transistor 7 to effectively ground or chassis or reference potential and transistor 7 will cut off. Current from the battery, or the alternator to the field winding 4 will be blocked. The diode 5 will permit continued current flow, however, which will be attenuated or decreased by the resistance of the field winding as well. When the voltage at point B is reduced below a pre-determined level, Zener diode 11 will cut off and transistor 7 again will become conductive, permitting current to be supplied from the battery, and the alternator, respectively, to the field 4 to cause an increase in output voltage of the alternator. These operating cycles will repeat and hold the voltage at point B effectively even or constant. The voltage at the division or tap point S of the voltage divider 10, 12 is effectively smooth or level due to the presence of the capacitor 13; the waviness of the voltage at tap point S is smoothed by the capacitor 13.

If the ripple, or waviness of the output voltage increases with increasing load, the increased waviness will affect the auxiliary Zener diode 18. When the instantaneous voltage across Zener diode 18 drops below the value at which it will block, transistor 16 will be blocked which causes transistor 14 to become conductive. When transistor 14 becomes conductive, the portion of the voltage divider formed by resistor 12 and capacitor 13, is effectively short circuited. Consequently, the voltage at terminal S which previously was determined by the resistance ratio of the resistors 10, 12 is changed, which causes a different working voltage to be applied to the main Zener diode 11. This causes the main Zener diode 11 to be effectively and reliably blocked, causing blocking of transistor 8 and hence continued conduction of transistor 7 and continued supply of power to the field 4 from the battery and the alternator. This increases the output voltage at the terminal B.

The effect will be output voltage-versus-current which has a characteristic as shown in the broken line of FIG. 3; in spite of increase of output current, the average output voltage from the alternator will be effectively constant.

The transistor 14 can be connected in various ways. As shown, one of the voltage divider resistors, resistor 12, is short circuited thereby when the transistor 14 is conductive. Transistor 14 is controlled to become conductive when the voltage variations, that is, when the portion of pulsation, or ripple increases beyond a pre-determined limit. As a consequence, the voltage division in point F is decreased. This smaller voltage division at point F is not ordinarily sufficient to permit the main Zener diode 11 to become conductive, and thus the voltage in point B rises. The output voltage of the alternator thus has been compensated, with respect to its mean or average value by a factor which is representative of the voltage variations of pulsations thereof, to obtain the essentially flat voltage-current characteristic shown in the broken line of FIG. 3. Therewith various voltage-current characteristics can be obtained by suitable choice of the voltage division ratio of the two auxiliary resistors 17, 19.

In the example shown, the output power from the star or center point of the armature 1 was added to the power of the generators by diodes 3. This is not a necessary feature of the circuit in accordance with the present invention, since the voltage ripple, with increased loading, also occurs without the use of this diode pair. The extent of ripple may depend on the particular alternator construction.

It is not always necessary to completely short circuit the entire portion of the resistor 12; but by suitable choice of resistance values, only a portion of the resistor 12 need be short circuited. It is also possible to connect the emitter-collector path of the transistor 14 with a series resistor which can be connected in parallel with resistor 12 to obtain the selected and desired voltage-current output characteristic.

In the example described, the main voltage divider resistors 10, 12, as well as the auxiliary voltage divider resistors 17, 19 are connected to provide sensing voltage outputs representative of the rectified output voltage from the alternator. By suitable choice of the respective voltage division values of the respective voltage dividers 10, 12 and 17, 19, it is also possible to use the output voltage of the star point of the armature 1 of the alternator as the representative output voltage therefrom.

In the preferred embodiment, the various semi-conductor elements 7, 8, 14, 16 are shown as transistors; it is also possible to use different types of semi-conductor switches, for example, thyristors, or the like.

Briefly, therefore, a portion of the main voltage divider resistance has an auxiliary semi-conductor switch connected in parallel with a portion thereof to modify or change the voltage sensed by the main Zener diode 11. By use of the auxiliary Zener diode 18, auxiliary output voltage representative of instantaneous output voltage of the alternator is sensed and, depending on the pulsation wave shape, or ripple at the auxiliary divider tap point, the auxiliary Zener diode 18 is rendered conductive, or not, the connection being so made that, as the ripple voltage increases, the auxiliary voltage divider provides a voltage to the auxiliary Zener diode 18 to control the auxiliary transistor 14 to modify the voltage at the tap or junction point S of the main voltage divider. Consequently, at high speeds and high loading, and as the voltage variation, that is, the voltage level of the ripple frequency VL increases to that of VL' (FIG. 1), resulting ordinarily in a drop of average value of the output voltage of the generator, compensation is affected so that the voltage-current characteristic will be essentially flat as shown by the broken line of FIG. 3.

Various changes and modifications may be made within the scope of the inventor's concept.

I claim:

1. Semi-conductor voltage regulator for connection to a dynamo electric generator (1) and adapted to control current flow through the field winding (4) of the generator (1) as a function of the output voltage of the generator, comprising
a main semi-conductor controlled switch (7) having its output connected to controlled current flow through the field winding (4) of the dynamo electric generator (1);
a main voltage sensing means (10, 11, 12) including a main voltage divider (10, 12) connected to sense average output voltage of the dynamo electric generator and controlling conduction of said main semi-conductor switch (7);
an auxiliary voltage sensing means (17, 18, 19) connected to the output voltage of the dynamo electric generator (1) and sensing minimum instantaneous voltage levels thereof;
and an auxiliary semi-conductor controlled switch (14, 16) having its output connected to the main voltage divider (10, 12) and modifying the voltage division ratio thereof, said auxiliary semi-conductor controlled switch (13, 16) having its input controlled by said auxiliary sensing means.

2. Regulator according to claim 1, wherein the auxiliary voltage sensing means (17, 18, 19) senses the waviness, or ripple amplitude of the output voltage.

3. Regulator according to claim 1, wherein the voltage divider (10, 12) includes a divider resistor, and auxiliary semi-conductor controlled switch is connected to short circuit at least a portion of said resistor.

4. Regulator according to claim 1, wherein said main voltage divider (10, 12) includes a resistor;

and said auxiliary semi-conductor controlled switch (14, 16) has its main switching path connected to said at least one resistor to modify the resistance value thereof and hence the division point of the voltage divider.

5. Regulator according to claim 1, wherein said auxiliary semi-conductor controlled switch comprises at least one transistor (14, 16).

6. Regulator according to claim 3, wherein said auxiliary semi-conductor controlled switch comprises at least one transistor (14, 16).

7. Regulator according to claim 4, wherein said auxiliary semi-conductor controlled switch comprises at least one transistor (14, 16).

* * * * *

UNITED STATES PATENT AND TRADEMARK OFFICE
CERTIFICATE OF CORRECTION

PATENT NO. : 4,128,799
DATED : December 5, 1978
INVENTOR(S) : Toshio MORISHIMA

It is certified that error appears in the above-identified patent and that said Letters Patent are hereby corrected as shown below:

Page 1, line [73] Assignee: should be

-- NIPPONDENSO CO., LTD., AICHI-KEN, JAPAN --

*Signed and Sealed this*

*Twenty-fourth* Day of *April 1979*

[SEAL]

*Attest:*

RUTH C. MASON
*Attesting Officer*

DONALD W. BANNER
*Commissioner of Patents and Trademarks*